UNITED STATES PATENT OFFICE.

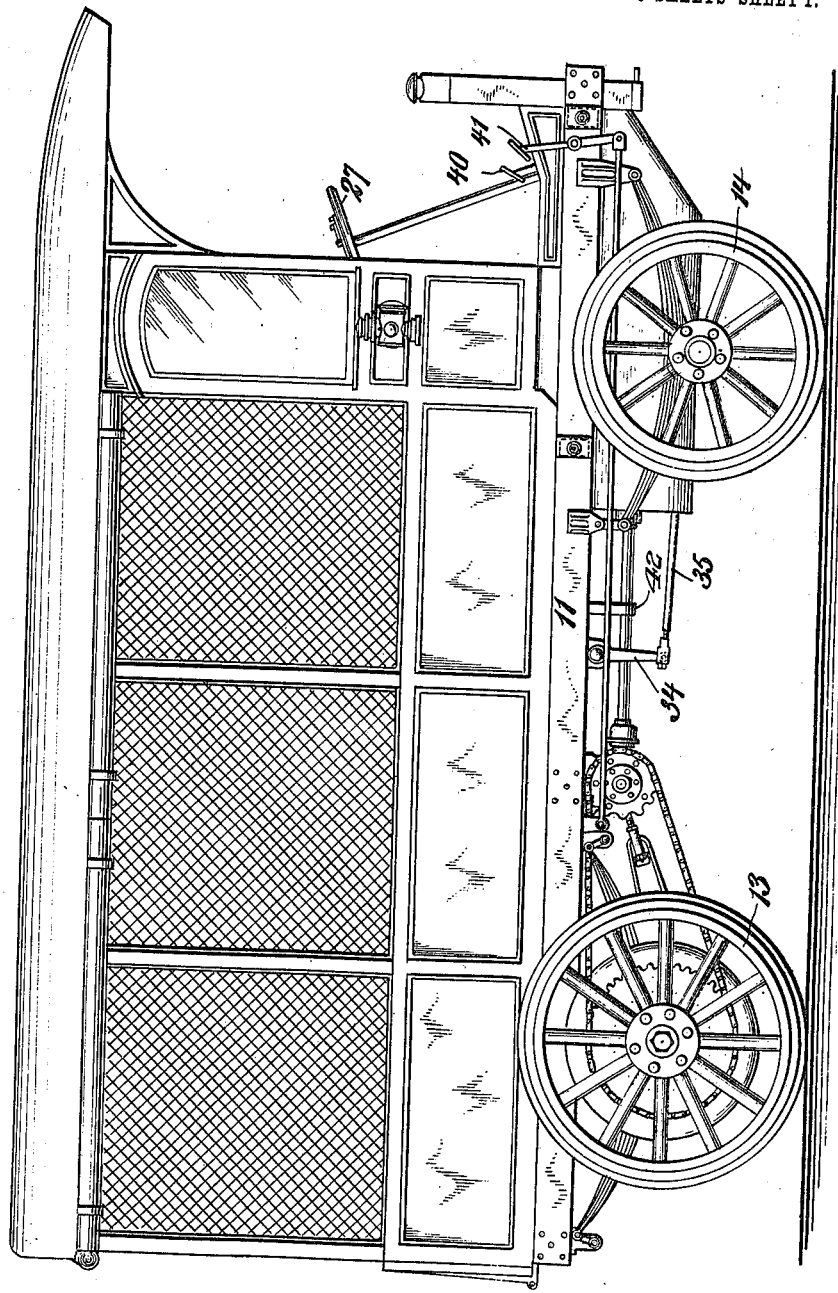

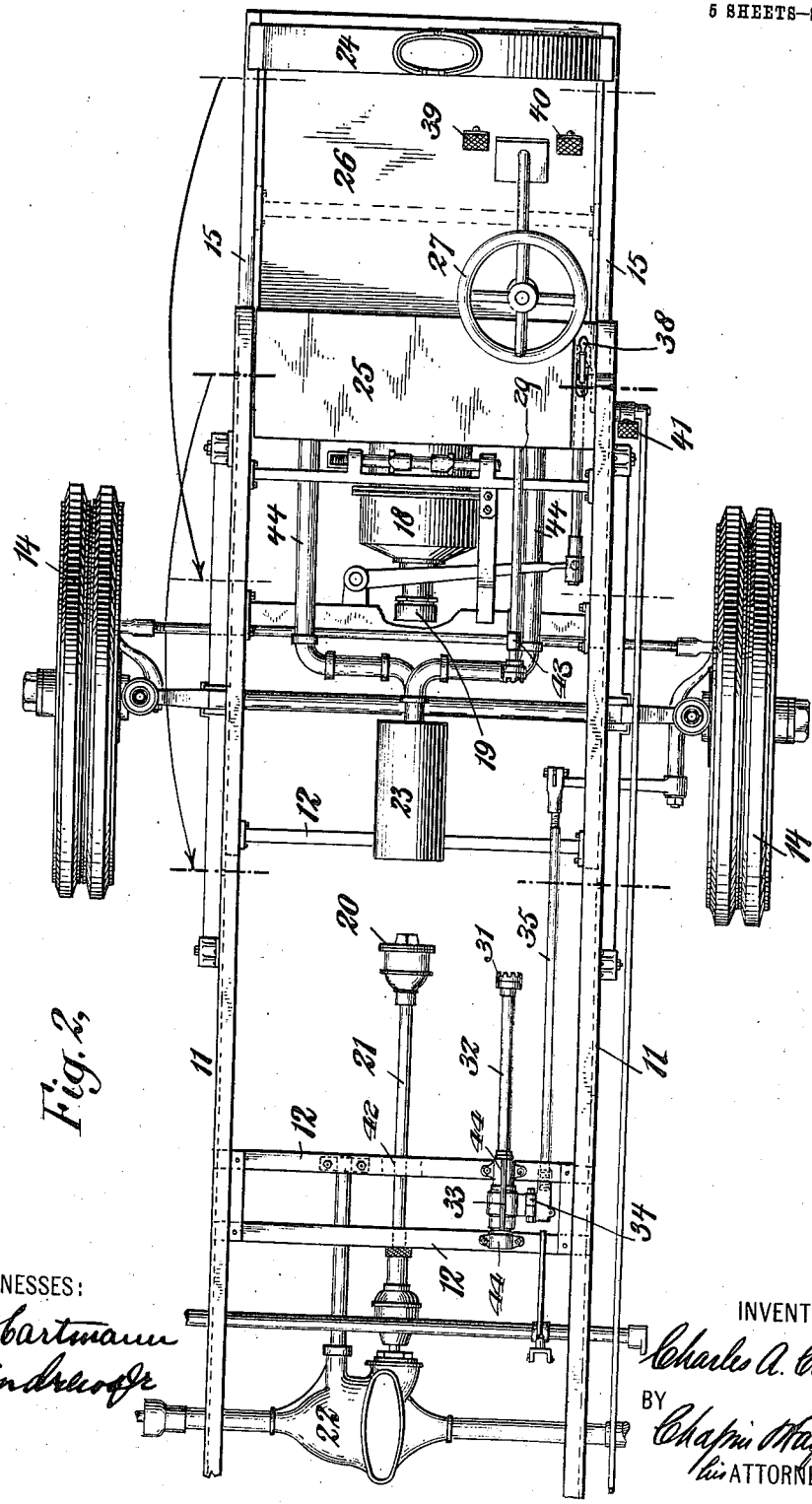

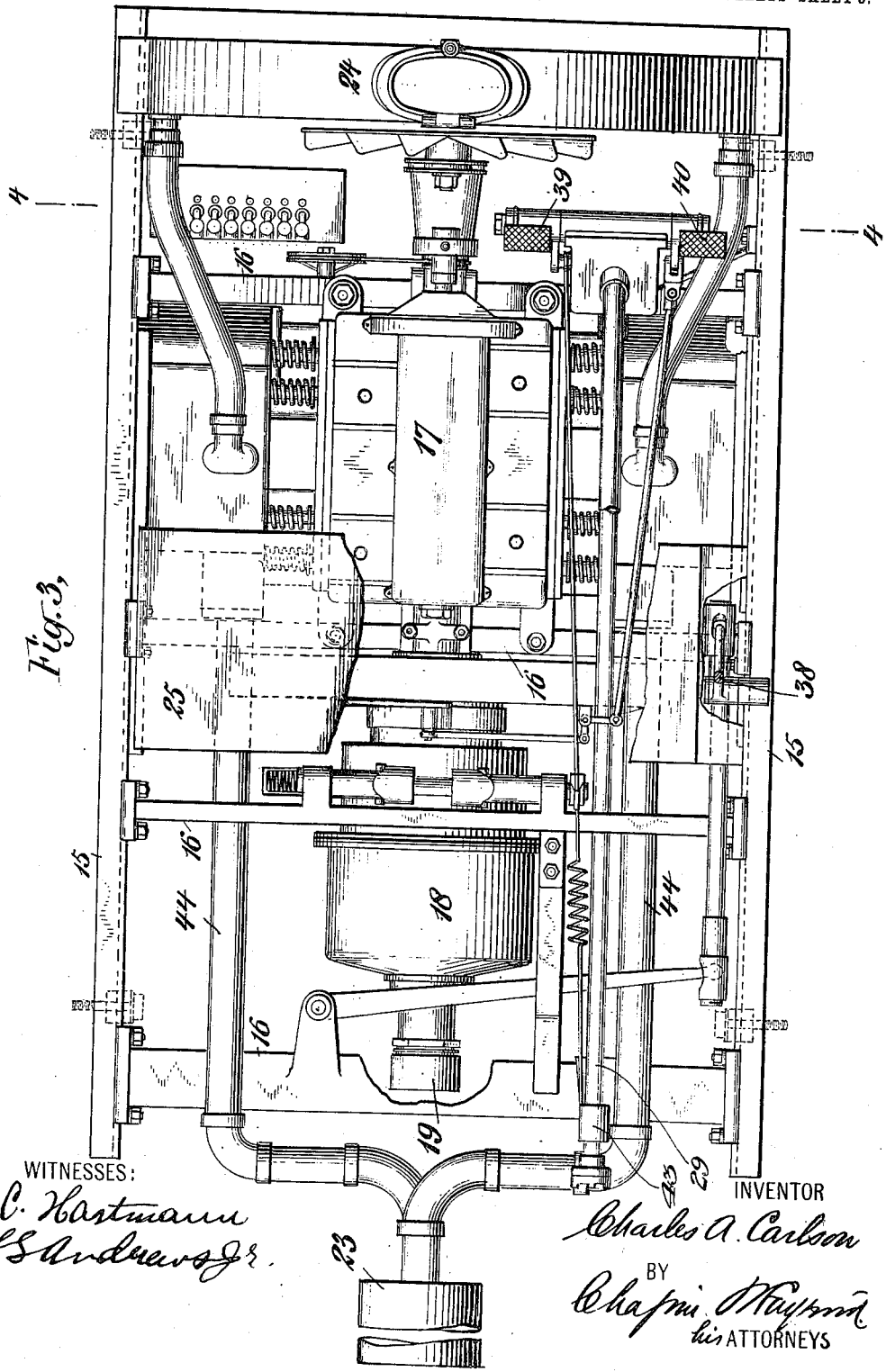

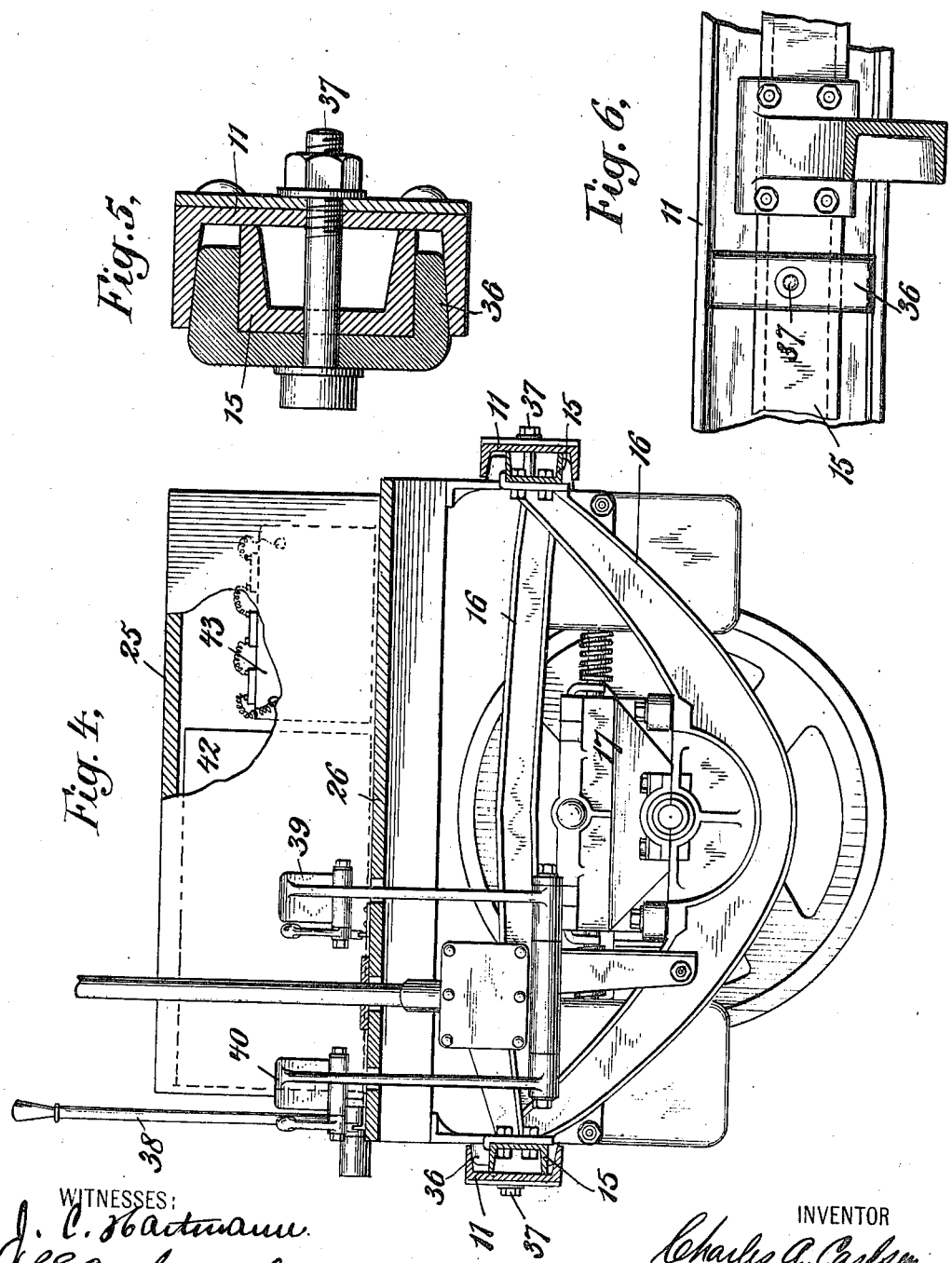

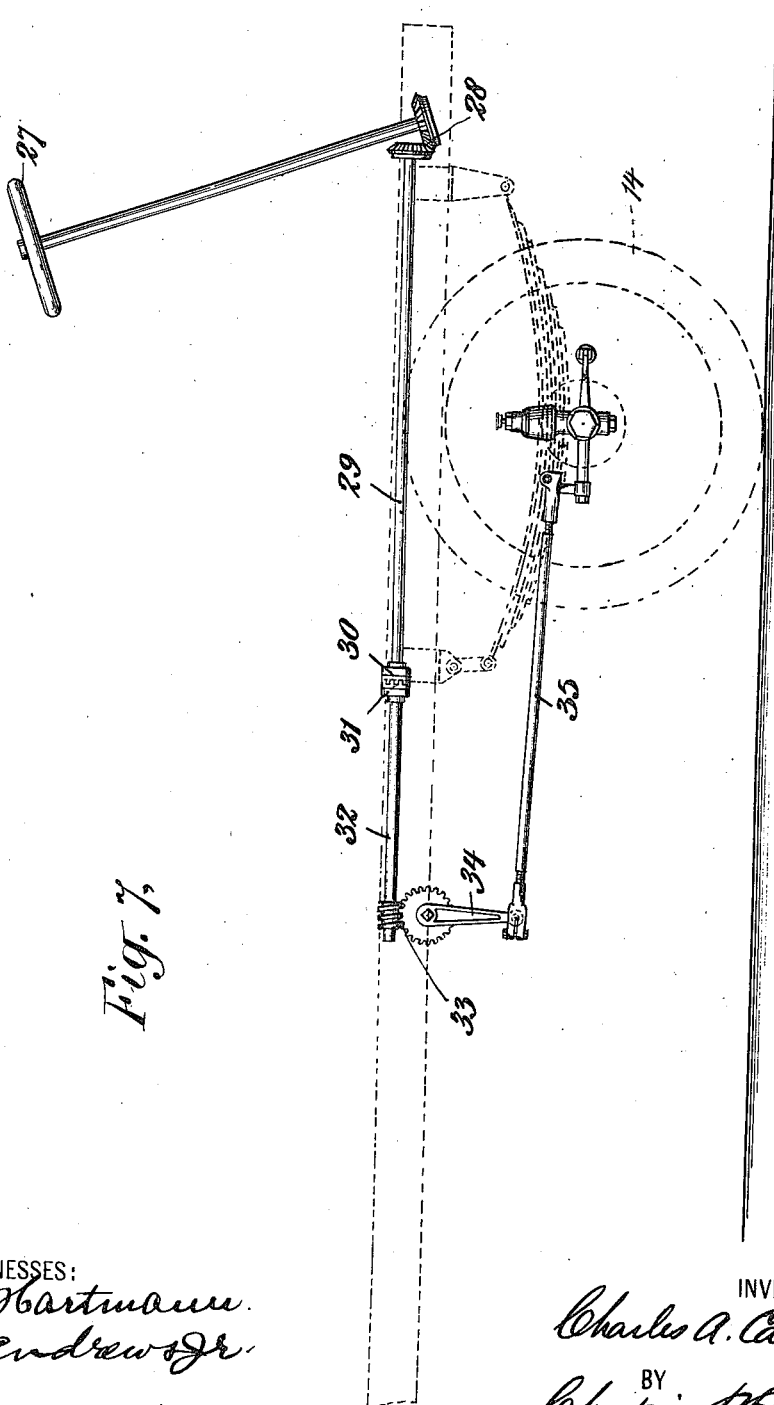

CHARLES A. CARLSON, OF BROOKLYN, NEW YORK, ASSIGNOR TO CARLSON MOTOR & TRUCK COMPANY, OF PHILADELPHIA, PENNSYLVANIA, A CORPORATION OF NEW YORK.

MOTOR-VEHICLE.

974,745.      Specification of Letters Patent.      Patented Nov. 1, 1910.

Application filed May 25, 1909. Serial No. 498,281.

*To all whom it may concern:*

Be it known that I, CHARLES A. CARLSON, a citizen of the United States of America, and a resident of Brooklyn, county of Kings, and State of New York, have invented certain new and useful Improvements in Motor-Vehicles, of which the following is a specification, reference being had to the accompanying drawings, forming a part thereof.

My invention relates to improvements in motor vehicles and particularly to a certain improved construction therein, whereby certain of the parts may be conveniently removed from the main frame, truck and body portion of the vehicle. In carrying out this part of my invention, I have provided a supplemental frame which may readily be removed from the main frame, and I mount the major portion of the operating mechanism of the vehicle upon the said supplemental frame, preferably providing such coupling members for connecting the parts carried by the supplemental frame with other parts carried by the main frame as will bring about operative engagement and disengagement thereof by the mere act of moving the supplemental frame into position and removing it therefrom.

In order that my invention may be fully understood, I will now proceed to describe an embodiment thereof, having reference to the accompanying drawings illustrating the same, and will then point out the novel features in claims.

In the drawings: Figure 1 is a view of the complete motor vehicle in side elevation. Fig. 2 is a top view of a portion of the chassis with the supplemental frame and parts carried thereby partially removed. Fig. 3 is a top view of the supplemental frame and parts carried thereby upon an enlarged scale, showing the same as removed from the vehicle and with certain parts broken away in order to more clearly show the parts beneath them. Fig. 4 is a view in vertical transverse section therethrough substantially upon the plane of the line 4—4 of Fig. 3, but also showing in section, the longitudinal channel irons of the main frame of the vehicle, and the means for connecting the supplemental frame to the said channel irons. Fig. 5 is an enlarged detail view in transverse section through the co-acting channel irons of the supplemental and main frames at one of the points at which they are bolted together. Fig. 6 is a detail view upon an enlarged scale of the same parts looking at right angles to the point of view of Fig. 5, and from the inside of the supplemental frame. Fig. 7 is a detail diagrammatic view in side elevation of the steering gear.

The motor vehicle as a whole comprises a vehicle body 10, a main frame composed of longitudinal side channel irons 11 and transverse connecting bars 12, rear driving wheels 13, front steering wheels 14, and suitable driving and steering mechanism. The driving and steering mechanism, in general, is shown in Fig. 3 and is carried by a supplemental frame comprising two longitudinal channel irons 15 and a plurality of transverse tie bars 16. A " Carlson " motor 17 conveniently of the type shown in U. S. Letters Patent No. 797,555 dated August 22nd, 1905, is suitably supported by the said frame work, the shaft of the said motor being connected in driving relation through transmission gearing 18, and a clutch 19—20 with a drive shaft 21 which in turn connects through suitable differential gearing 22 with the driving wheels 13 of the vehicle. The clutch member 19 is secured to the transmission gearing 18 which, being connected with the motor shaft, is carried by the supplemental frame, while the clutch member 20 is carried by the shaft 21 upon the main frame of the vehicle, the said shaft being supported thereby through its connection with the differential gearing 22 and a bearing 42 upon one of the transverse connecting bars 12. These two clutch members are adapted to co-engage by the mere act of sliding them into position, and disengage by the mere act of pulling them longitudinally apart. The exhaust of the motor discharges through exhaust pipes 44 into a muffler 23 which is also carried by the supplemental frame, and at its front end the supplemental frame supports a radiator 24 for cooling the water which is circulated around the jacket of the motor. The driver's seat 25 is also carried by the supplemental frame, the same constituting, as a whole, a box-like structure which incloses the fuel tank 42 for the motor and the electric batteries 43 for the ignition system. A suitable flooring 26 is preferably provided between the seat and the radiator which is also carried by the supplemental frame. The transmission gearing is conveniently controlled by means of a hand lever 38, and a foot pedal 39, both carried by the said supplemental frame.

The steering gear comprises a steering wheel 27, bevel gearing 28 operated thereby, and a longitudinal shaft 29 having a coupling member 30 at the rear end thereof, all carried by bearings upon the supplemental frame, one of which is shown at 43 in Figs. 2 and 3. The coupling member 30 is adapted to co-engage with a complementary coupling member 31 arranged at the front end of a longitudinal shaft 32 supported by bearings 44 upon the main frame of the vehicle and which forms a continuation of the shaft 29. At its rear end the shaft connects through worm wheel gearing 33 with an operating arm 34 and thence through a link 35 with the steering knuckles of the front wheels 14. The coupling 30—31 is of a form similar to the clutch 19—20 above described in that it will be connected together in rotative relation by the mere act of bringing the parts longitudinally together and similarly will cause the parts to be disengaged by the mere act of drawing them longitudinally away from each other.

The foregoing arrangement of the steering gear is advantageous apart from the convenient manner in which the shaft members 29 and 32 may be connected and disconnected in that by placing the worm gearing 33 and operating arm 34 nearer the rear end of the vehicle, the link 35 may be made of considerable length and it will conveniently lie in a direction at right angles to the direction of movement between the frame of the vehicle and the wheels due to the usual spring action whereby such movement will have a minimum of effect upon the steering knuckles. This will be readily understood by reference to Fig. 7 in which the relationship of the steering gear with respect to the frame generally and the steering wheels, is shown somewhat diagrammatically. The arrangement renders the steering of the vehicle much easier and helps to hold the vehicle true upon its course.

It will be understood that the foregoing improvement in the steering gear is applicable to other forms of automobile construction than that disclosed herein, i. e., other forms of motor vehicles than that including a removable supplemental frame carrying the power plant, but the broad claims upon the steering gear have been divided out of this case in compliance with an office action for division, and the same will be found in another application filed as a divisional of the present case upon the 23rd day of April, 1910, and serially numbered 557,142.

As will be seen more particularly by reference to Figs. 4 and 5, the channel irons 11 and 15 of the main and supplemental frames, respectively, are arranged to slide one within the other, shoes 36 being provided to limit the points of contact, four of said shoes being preferably provided whereby the frames engage each other at four points only. Clamping bolts 37 are provided which pass through the said shoes and through the channel irons of the supplemental and main frames whereby to bolt the two frames together securely in their normal rest position. The outer faces of the shoes 36 are preferably made slightly tapered to conform to the usual face of the channel irons constituting the frame members 11 whereby when the bolts 37 are drawn up tight the wedge like action will cause the parts to be fastened very securely in position. When the supplemental frame is so secured in position upon the main frame, the clutch members 19 and 20 are in engagement, as are the coupling members 30 and 31, so that in this position driving movements will be properly transmitted from the motor 17 to the shaft 21 and steering movements will be transmitted from the steering wheel 27 to the shaft 32. When, for any reason, it is desired to remove the supplemental frame, it is only necessary to first remove the four bolts 37 and then to slide the supplemental frame forward until it is entirely clear of the main frame. There is absolutely nothing to impede this movement as the clutch members 19 and 20 and coupling members 30 and 31 freely permit it and there are no other connections between the parts carried by the supplemental frame and the parts carried by the main frame. In thus removing the supplemental frame, practically all of the driving mechanism of the vehicle is removed, whereby the same may be conveniently repaired, or a fresh set of driving mechanism and another supplemental frame may be replaced therefor. The supplemental frame, as will be understood from the foregoing, carries with it the motor and all its parts, the transmission gearing, the muffler, the radiator, the fuel and water tanks and many other correlated parts.

I have shown a pedal 40 upon the supplemental frame for operating an engine brake, and a pedal 41 upon the main frame, for operating brakes on the rear wheels.

What I claim is:

1. In a motor vehicle, the combination with a main frame and rear driving wheels and front steering wheels carried thereby, of a supplemental frame arranged in longitudinal sliding relation with the said main frame, whereby it may be longitudinally removed from the front of the vehicle, a motor and correlated parts carried by the said supplemental frame, a manually operated steering member also carried by the said supplemental frame, longitudinally disposed sliding clutch members for connecting the motor and the driving wheels in driving relation, one of the said members being carried by the main frame, and the other by the said supplemental frame, and longitudinally disposed sliding clutch members for connecting the manual steering member in operative steering relation with the steering wheels, one of the said members being carried by the main frame, and the other by the supplemental frame, the said clutch members being operatively engaged and disengaged by the mere act of sliding the supplemental frame into and out of its operative position in the main frame.

2. In a motor vehicle, the combination with a main frame including longitudinally disposed side channel irons, of a removable supplemental frame including longitudinal channel irons arranged to slide in the channel portions of the first said side irons and to be supported thereby, shoes of wedge-like form between the two sets of channel irons, a motor carried by the said supplemental frame, and bolts disposed with their axes horizontal and at right angles to the direction of movement of the said supplemental frame, for clamping the two sets of channel irons and the said shoes together.

3. In a motor vehicle, the combination with a main frame including longitudinally disposed side channel irons, of a removable supplemental frame arranged to slide in the channel portions of the said side irons and to be supported thereby, shoes between the said supplemental frame and side irons, a motor carried by the said supplemental frame, and bolts arranged to pass through the side channel irons, the said shoes and portions of the said supplemental frame, to clamp the said supplemental and main frames together.

CHARLES A. CARLSON.

Witnesses:
D. HOWARD HAYWOOD,
J. C. HARTMANN.